United States Patent [19]

Vig

[11] Patent Number: 4,791,311

[45] Date of Patent: Dec. 13, 1988

[54] TWO-TERMINAL MULTIPLEXABLE SENSOR

[75] Inventor: Ravi Vig, Concord, N.H.

[73] Assignee: Sprague Electric Company, North Adams, Mass.

[21] Appl. No.: 101,720

[22] Filed: Sep. 28, 1987

[51] Int. Cl.$^4$ ................... B60Q 1/00; B62D 45/00
[52] U.S. Cl. ................................. 307/10 R; 307/38; 370/85; 340/52 F
[58] Field of Search ............... 307/10 R, 9, 38, 39; 370/85; 340/52 F

[56] References Cited

U.S. PATENT DOCUMENTS

| | | | |
|---|---|---|---|
| 4,256,515 | 3/1981 | Miles et al. | 148/1.5 |
| 4,374,333 | 2/1983 | Avery | 307/309 |
| 4,584,487 | 4/1986 | Hesse et al. | 307/10 R |
| 4,589,282 | 5/1986 | Dumery | 73/313 |
| 4,639,609 | 1/1987 | Floyd et al. | 307/10 R |
| 4,677,308 | 6/1987 | Wroblewski et al. | 307/10 R |

Primary Examiner—William M. Shoop, Jr.
Assistant Examiner—Sharon D. Logan

[57] ABSTRACT

An integrated circuit field-to-electrical energy sensor is capable of being energized through two DC voltage supply terminals. Each of a plurality of such sensors, when connected in parallel so as to be energized from a single DC supply voltage source, is capable of recognizing by means of an address code comparator a unique pulse signal code superimposed on the DC supply voltage. Stimulated by that code which is unique to only that sensor, that sensor powers up the transducer, e.g. Hall element, and responds by drawing a particular current pattern from the common DC voltage source indicative of the presence (or absence) of a field, e.g. magnetic, that is ambient to that sensor. Electrically controlled energy to the transducer provided only when the unique code is present is supplied by the switchable of two regulated voltage outputs from a dual voltage regulator having a control input connected to the output of the address code comparator. The steady (unswitched) regulated output voltage supplies energy to the MOS logic including the address code comparator. The sensor quiescent current drawn from the DC voltage supply line is thereby caused to be a very low value which becomes increasingly advantageous as more and more sensors are operated in parallel on the same DC supply line.

12 Claims, 5 Drawing Sheets

TWO-TERMINAL MULTIPLEXABLE SENSOR

BACKGROUND OF THE INVENTION

This invention relates to a multiplexable sensor that has two terminals through which it may be energized and addressed and through which it may respond upon being addressed.

Multiplexable sensors of the prior art capable of some or all of these functions have been employed in automobiles or other vehicles wherein many similar sensors are energized from a common DC voltage source so as to require few wires, preferably only one wire, and a chassis ground connecting all the sensors. The sensors may be capable of detecting light, nuclear radiation, a magnetic field, an electrified open circuit or closed circuit, etc. whereby the transducer incorporated in the sensor converts one of those kinds of energy to an electrical signal. Such sensors are capable of detecting the presence or absence of fields having a predetermined minimum field strength, a particularly useful feature when used to detect vehicle performance or functions such as low fluid levels, low fluid pressuresm low or high temperature, etc.

Particularly, it is known to use an integrated circuit Hall switch as a proximity detector which is readily used to detect discrete levels whereby the position of a magnet carrying float is monitored by the IC Hall switch. Such a liquid level detector is described by Dumery in U.S. Pat. No. 4,589,282 issued May 20, 1986. Also, a simple two-terminal Hall switch sensor is described by Avery in U.S. Pat. No. 4,374,333 issued Feb. 15, 1983. Both patents are assigned to the same assignee as is the present invention.

It is an object of the present invention to provide a two-teminal-multiplexable sensor having a low standby or quiescent current drain; namely, current drain when the sensor is not addressed.

SUMMARY OF THE INVENTION

A two-terminal multiplexable sensor is formed in a silicon integrated-circuit chip. Each chip has a power terminal, to which a DC supply voltage may be applied to energize the sensor, and a ground reference terminal. The sensor includes a binary counter means for counting voltage pulses that may be superimposed on the DC supply voltage, and a fixed binary address code circuit means for providing a particular fixed-circuit binary-number address by which the sensor may be distinguished electrically from other two-terminal multiplexable sensors. The sensor also has an address code comparator means for providing a match signal only when the count of the accumulated count of the counter means matches the binary number. A switchable current source is connected to draw current from the power terminal to the ground terminal, and a field to voltage transducer of an ambient field of predetermined (fixed) amplitude to one of two binary electrical voltage levels.

A unique power saving transducer control means is included for turning on the transducer and current source for at least a portion of each period during which the field is present and the accumulated count matches the field address code, and for turning off the transducer during all periods when the accumulated count does not match the sensor address code.

The transducer control means is preferably comprised of a logic circuit and a dual voltage regulator circuit wherein one regulated voltage is switched on or off by the logic circuit and the other regulated voltage is fixed. The switchable regulated voltage may supply energy to the transducer and to the current source also. Alternatively, the current source may be switched on and off by the output signal from the Hall switch.

This invention recognizes that the number of two-terminal multiplexable sensors that may reliably be connected in parallel to a common DC voltage source is limited by the total current drawn by all the sensors because the sensor response current to be detected at the source tends to be masked by this total current. In other words, it is a limitation of a signal to noise ratio.

In a sensor of this invention the transducer is turned off whenever the sensor is not in the addressed condition. And preferably, this is accomplished by a novel controllable voltage regulator that supplies the operating energy to the transducer and is switched on and off by the logic circuit that is guided by the output states of the transducer itself and the address code comparator means.

A further reduction in sensor quiescent current and a concomitant increase in sensor signal to noise ratio may be achieved by forming the counter means, address code comparator means and logic circuit portion of the transducer control means of MOS transistors and mainly using CMOS circuitry so that these circuits contribute insignificantly to the sensor quiescent current.

Thus, sensors of this invention have a higher signal to noise ratio and consequently more such sensors may be used together in multiplexed operation. In addition, sensors of this invention dissipate relatively little power, and can operate over a wide temperature range, have a larger signal to noise ratio, may occupy less silicon real estate, and offer all the other advantages of economy and performance inherent in this low-quiescent-current sensor.

DESCRIPTION OF THE PREFERRED EMBODIMENT

Figure 1A:
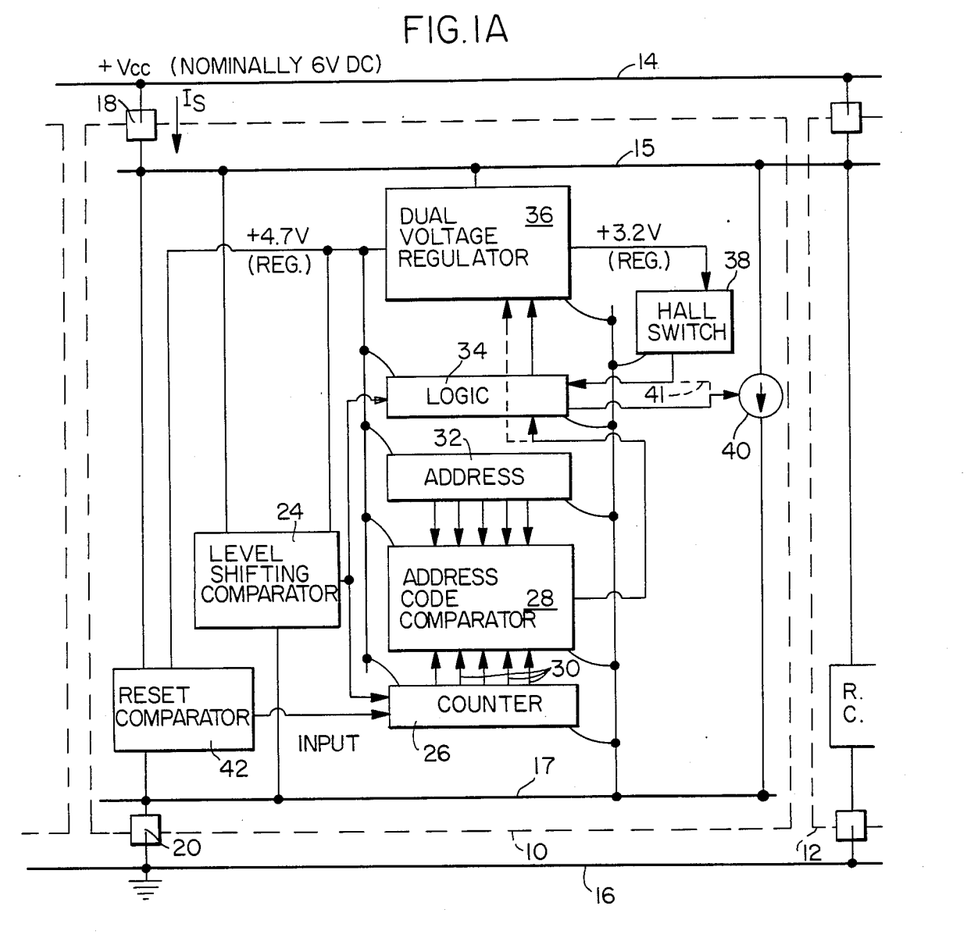
FIG. 1A shows a block diagram of a two-terminal integrated-circuit sensor 10 of this invention that is connected in parallel with at least one other sensor 12.

The integrated circuit sensor 10 represented by the block diagram in FIG. 1A, is intended to be one of many such sensors connected in parallel by the conductors 14 and 16. A second of those other sensors 12 is partially shown.

Sensor 10 has two terminals or terminal pads 18 and 20. The power bus 14 is preferably a wire that is connected to terminal pad 18 that in turn is connected to the sensor voltage supply line 15. The ground reference conductor 16, that is connected to the terminal pad 20, is preferably the metal chassis of a vehicle in which the parallel connected sensors 10, 12, etc. are installed. Pad 20 is in turn connected to the sensor ground line 17.

Figure 2A:
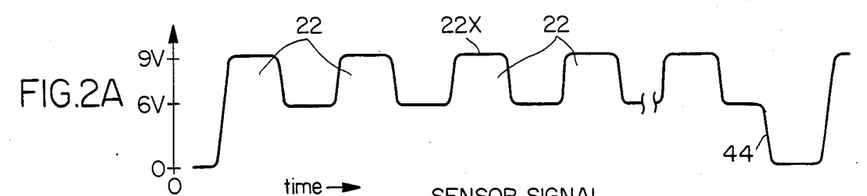
FIG. 2A shows a curve representing a voltage as a function of time appearing at the supply voltage conductor 14.

Sensor 10 is capable of detecting and counting positive going voltage pulses 22, referred to hereinafter as addressing pulses, that may appear superimposed on the DC supply voltage Vcc (on bus 14 in FIG. 1A) as shown in the waveform of FIG. 2A. The level shifting comparator 24 to which the DC supply voltage Vcc is directly applied produces a clock pulse at the input of the binary counter 26 at the initial or rise portion of each addressing pulse 22.

The stored count appears at any instant of time as a binary voltage code at the five lines 30 connecting the counter 26 to the address code comparator 28. A unique fixed binary address number assigned to and predetermined for this particular sensor 10 is hard-wire stored in the address circuit 32. The address code comparator 28 produces a logic control signal at the input of the logic circuit 34 only when the stored count appearing on the counter output lines 30 is the same binary number as is the hard-wire stored binary number in the address circuit 32.

When the number of address pulses (22) on power bus 14 reaches the number for which the sensor 10 is address coded (in block 32), at the last of that series of address pulses 22, the logic circuit 34 produces a signal at the control input of dual voltage regulator 36 effecting the turning on of the 3.2 volts regulated output to energize the Hall switch circuit 38. Consider what happens if at the same time, Hall switch 38 detects the presence of a magnetic field (of predetermined minimum field strength).

Then a control signal from the Hall switch 38 turns on the switchable constant current source 40 that draws a predetermined amount of additional current from power conductors 14 and 16 which is recognizable at the supply voltage source (not shown) as indicating a minimum strength magnetic field at sensor 10.

Figure 2B:
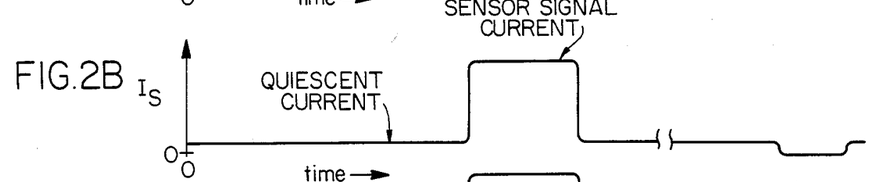
FIG. 2B shows a curve representing the current drawn from the power source (not illustrated) through the sensor pad 18 indicating the presence of a field at sensor 10.
Figure 2C:
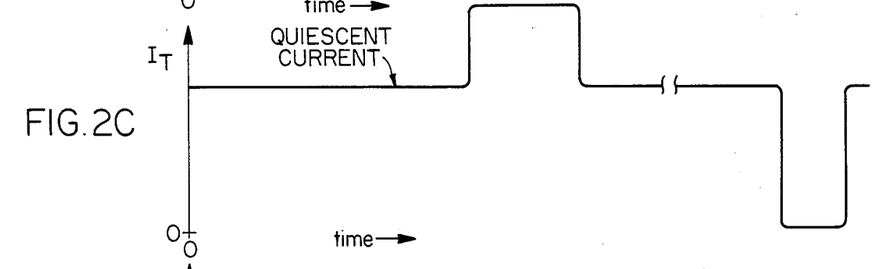
FIG. 2C shows a curve representing the current drawn from the power source through the power source wire 14 by sensor 10 and thirty other sensors having different address codes. Curves 2B and 2C are to the same time scale as that of FIG. 2A.

If the binary code assigned to sensor 10 is for a count of three and the magnetic field is present, then during the time between the rise portions of the third addressing pulse 22X and of the subsequent addressing pulse, the current $I_S$ illustrated in FIG. 2B drawn through the terminal pad 18 of sensor 10 is many times greater than at any other time. If a total of thirty sensors are connected in parallel with sensor 10, the total current $I_T$ drawn in power supply wire 14 may be as shown in FIG. 2C. Here the total quiescent sensors current is much greater and the superimposed sensor signal current from sensor 10 is more difficult to detect in combination with this quiescent current from thirty other sensors. This illustrates the need to minimize the quiescent current of each sensor.

Now when the next count pulse 22 occurs, the output code-match signal from the address code comparator 28 is terminated, and via logic block 34 and voltage regulator 36, the Hall switch circuit 38 is again deactivated and the current source 40 is also turned off.

It will be appreciated that in this embodiment, the sensor remains for an addressed interval in the "addressed" condition beginning at the rise time of the addressing pulse completing the sensor-assigned address code count and continuing until the next addressing pulse occurs. Other addressing schemes are possible wherein an addressed interval occurs only during the presence of address signal at the sensor terminals, e.g. where the address code is a superimposed alternating voltage of an unique frequency.

If only the above-described field sensing 30 performance is to be executed by a sensor 10, the logic circuit 34 could be removed and simply replaced by a direct connection between the output of the address code comparator 28 and the control input of the voltage comparator 36.

In this case, the Hall switch 38 may be directly connected via the dashed line 41 shown in FIG. 1 to the current source 40 rather than through the logic circuit 34. Also the output of the address code comparator 28 may then be directly connected to the control input of the dual voltage regulator 36.

Figure 2D:
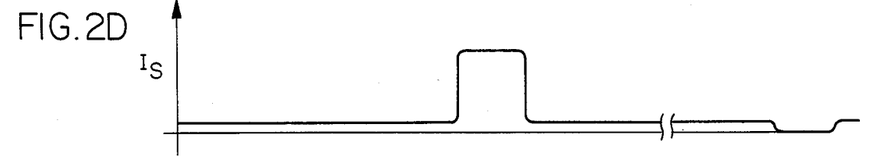
FIG. 2D shows a curve representing the current drawn from the power source through the sensor pad 18, indicating the presence and operativeness of sensor 10 and the absence of a field at sensor 10.

However, the logic circuit 34 is added in this embodiment to provide a diagnostic signal on the Vcc line 14. Accordingly, the last addressing pulse 22X to complete the address count unique to sensor 10 has a duration corresponding essentially to the duration of the then present clock pulse (from comparator 24), so by connection to the output of the comparator 24 the logic circuit may detect the actual presence of that clock pulse from start to termination. Logic circuit 34 directly controls and turns on the current source 40 during the presence of that address completing pulse 22X whether or not the Hall switch 38 senses a field and signals the current source 40 to do so. That current in conductor 14 is thus an indication that the sensor 10 is present. After the termination of that address completing pulse 22X and before the onset of the next addressing pulse 22, if there is an ambient magnetic field, then the Hall switch output will take over the function of keeping the current source 40 in the "on" condition to further indicate the presence at sensor 10 of the magnetic field as illustrated in FIG. 2B. However, if the magnetic field is not present, then the current $I_S$ is large only during only the first half of the period, corresponding to the "last" addressing pulse 22X, as illustrated in FIG. 2D.

The reset comparator 42 produces at the counterreset input a resetting pulse when the DC supply voltage is being turned on; i.e. when the supply voltage Vcc rises from near zero volts to about 6 volts, and the counter is reset. Thus a brief interruption of the supply voltage, a momentary zero voltage pulse 44 (e.g. of about 0.5 microseconds width or more) as illustrated at the right hand side of FIG. 2A, will reset the counter 26 to zero count.

Figure 3:
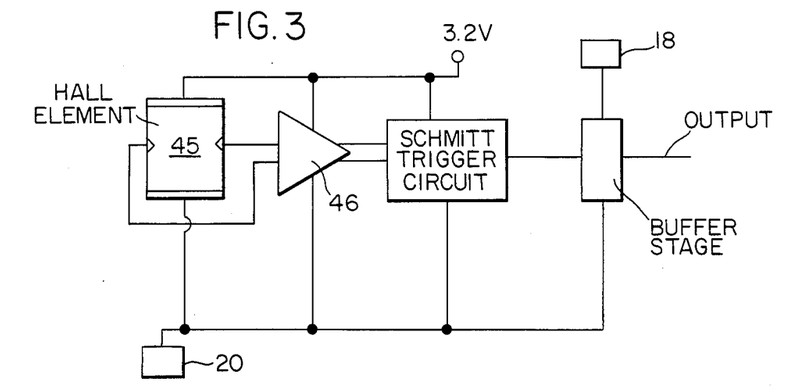
FIG. 3 shows a block diagram of the Hall switch 38.

The Hall switch 38 is of the kind described by Higgs in the patent application Ser. No. 912,719 filed Sept. 29, 1986 and assigned to the same assignee as is the present invention. Hall switch 38 consists of at least a Hall element 45, a Hall voltage amplifier 46, and a Schmitt trigger circuit 48 as shown in FIG. 3. All three blocks are connected in tandem and energized from the 3.2 volts regulated voltage line when a magnetic field, e.g. greater than about 100 gauss, is present. Then the Hall switch output changes from a high voltage state to a low voltage state that is detected by logic circuit 34. If the diagnostic feature is not provided and the logic circuit 34 not employed, a buffer stage may be used at the output of the Hall sensor 38 to directly produce a high voltage output state when the magnetic field is present so as to directly turn on the pair of bipolar transistors making up the current source 40 via the alternative connection 41.

Figure 1B:
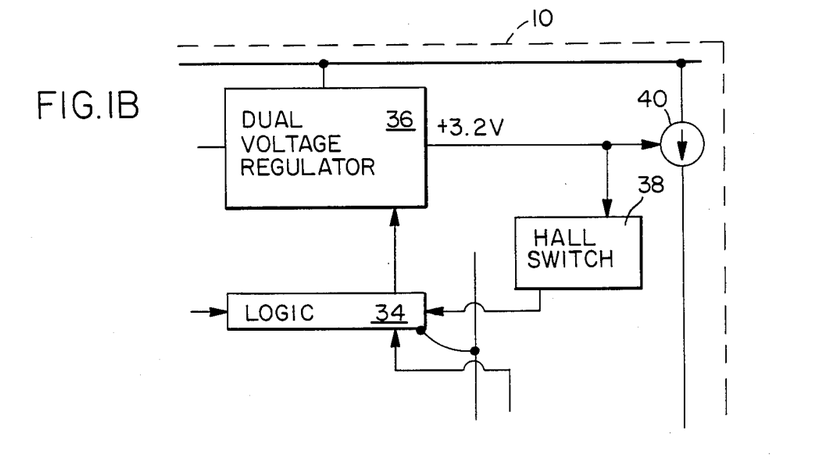
FIG. 1B shows an alternative preferred connection in a sensor 10 of this invention between four of the circuit blocks.

In another alternative circuit relationship between the logic 34, and the dual voltage regulator 36 and the Hall switch 38, both the field sensing feature and the diagnostic feature are provided in a different and even more advantageous way. During addressing pulse 22X, the current source 40 is turned on whenever the 3.2 volt line from the voltage regulator is active. Here the logic circuit 34 utilizes the output signals from the level shifting comparator 24 and the address code comparator 28. When at the same time the magnetic field is present, then the logic circuit 34 is so informed by the output from the Hall switch and holds the Hall switch and the current source on during the second half of the period; namely, after termination of pulse 22X and the rise of the subsequent pulse 22. The total current $I_S$ is then as in FIG. 2B. But if the magnetic field is not present, then the logic circuit being so informed by the Hall switch 38 turns off the 3.2 volt line and consequently turns off the Hall switch 38 and current source 40. Thus, by a different approach, the total sensor current again is as illustrated in FIG. 1D.

Now the Hall switch current (e.g. about 4 milliamperes) adds to the current-source current (e.g. about 12 milliamperes) and not as in the prior described embodiment wherein the current-source current adds to the total quiescent current $I_T$ (e.g. about 60 milliamperes). This amounts to a sensor signal to noise ratio improvement of more than 40%. Thus 40% more sensors can be operated together in a multiplexed system, for example. And also the maximum power dissipation in the sensor chip 10 is significantly reduced leading potentially to a smaller less costly IC chip, a smaller IC chip package and to a capability to operate at higher temperatures.

Figure 4:
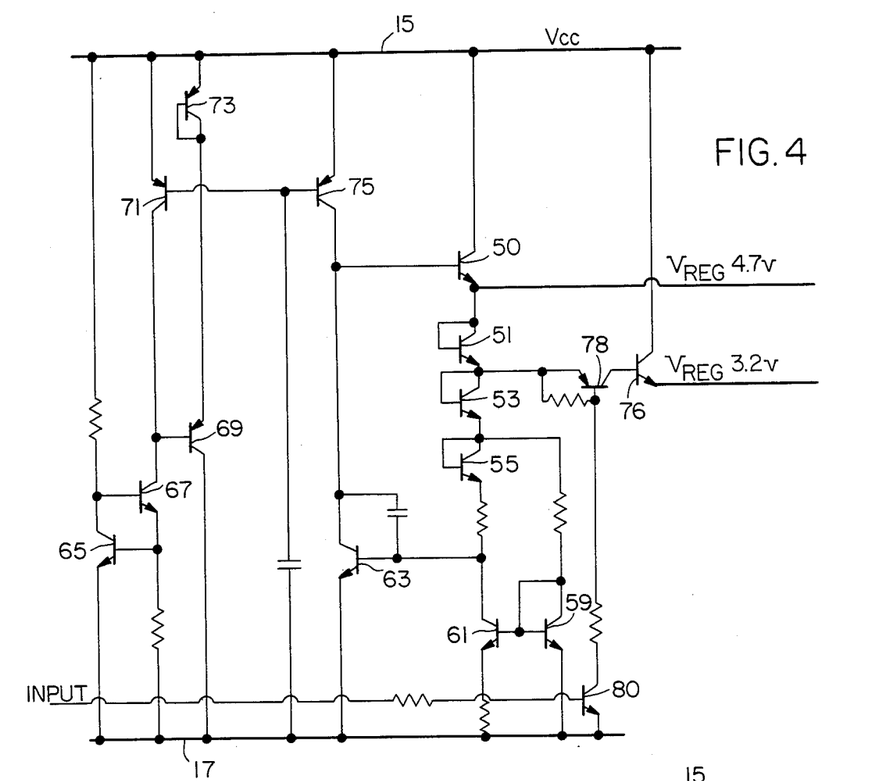
FIG. 4 is a circuit diagram of the dual voltage regulator 36.

Referring to FIG. 4 the dual voltage regulator 36 has a first series regulating transistor 50 supplying current to the regulated 4.7 volts line. Transistor 50 along with transistors 51, 53, 55, 59, 61, 63, 65, 67, 69, 71, 73 and 75 form a standard band-gap regulator that provides the regulated 4.7 volts at all times that Vcc exceeds about 6 volts. The series regulator transistor 76 has a base connected between transistors 51 and 53 via transistor 78 and supplies current to the regulated 3.2 volts line. The 3.2 volts is essentiallt two $V_{BE}$ (that of transistors 51 and 76) less than the 4.7 volts. Transistors 51, 53 and 59 and resistor 57 are connected in series from the emitter of the series regulating transistor 50 and ground and thus serves as a voltage divider from which transistor 76 obtains a voltage reference.

Transistor 78 is capable of being turned on or off when transistor 80 is rendered conducting or nonconducting, respectively. Transistor 80 is turned on and oft by the output from the logic circuit 34 (or directly from the output of the address code comparator. The regulator control input is at the base of transistor 80. That input is connected to the output of the logic circuit 34 or alternatively directly connected to the output of the address code comparator 28.

The regulator 36, the level shifting comparator 24 and the reset comparator 42 are all formed with bipolar transistors which, in comparison with field effect (e.g. MOS) transistors, are capable of withstanding high voltage noise spikes of the kind often present in automobile and other vehicle circuits. These circuit blocks are directly connected to the Vcc line 14. The three blocks, counter 26, address code comparator 28 and logic circuit 34 are formed of MOS transistors. All transistors of both kinds are formed in the same silicon sensor chip by a process described by Miles et al in the patent U.S. Pat. No. 4,256,515 issued Mar. 17, 1981.

The quiescent current drain of these MOS transistor circuits is an order of magnitude less than that of the three above-noted bipolar transistor blocks, and the quiescent current drain of the entire sensor is less than 2 milliamperes in this preferred embodiment.

The MOS transistor blocks are energized from the steady regulated 4.7 volts supplied by the dual regulator 36. The Hall switch circuit 38 is supplied energy by the switched regulated 3.2 volts line that is only on during a period between the pair of addressing pulses in which the sensor is in the addressed state.

Figure 5:
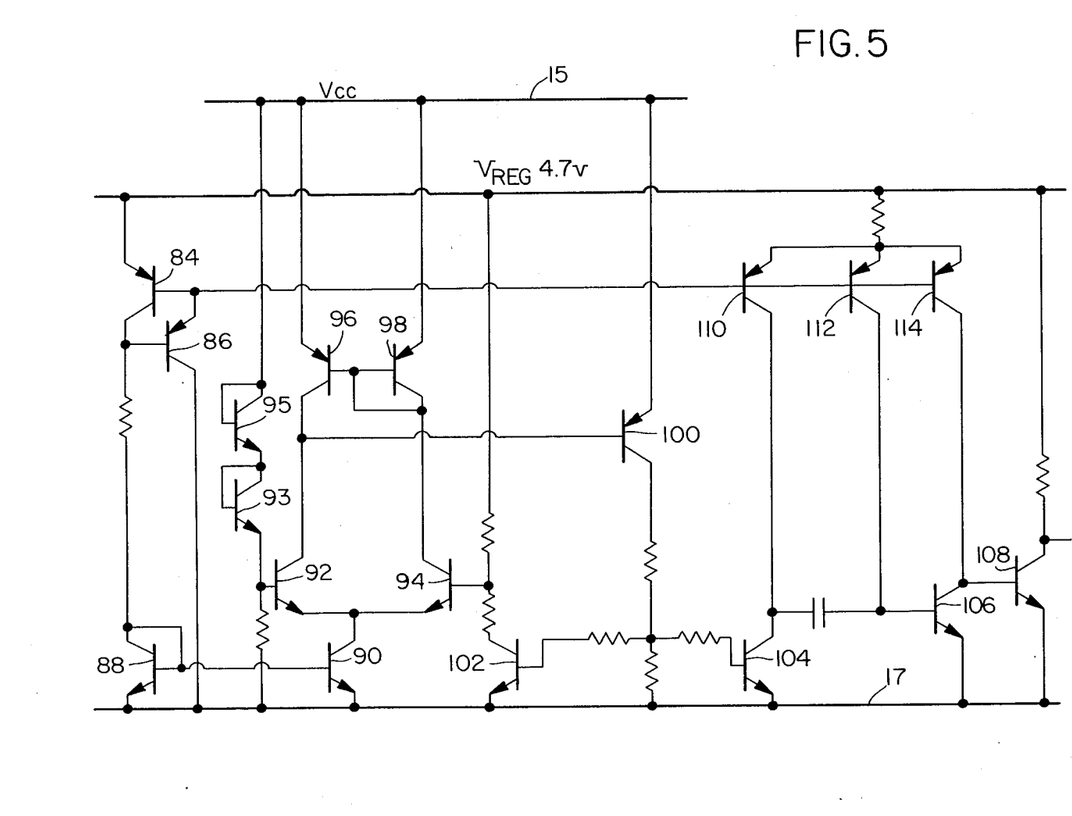
FIG. 5 is a circuit diagram of the reset comparator 42.

With reference to FIG. 5, the reset comparator includes a monostable multivibrator comparator comprising transistors 84, 86, 88, 90, 92, 94, 96, 98, 100 and 102. The two comparator inputs are at the bases, respectively, of transistors 92 and 94 that are respectively connected to the pad 18 at which Vcc is supplied and to the regulated 4.7 volts line from the regulator 36. This reset comparator 42 is so connected to the dual regulator 36 that it will produce a counter reset output pulse only after the regulator voltage energizing the counter has reached the fully regulated 4.7 volts. This feature insures that no matter what the rise time of the rising Vcc voltage may be, the counter is stabilized before it is reset to zero count. The reliability of resetting is thus greatly enhanced because in a vehicle having many such sensors parallel connected via a long Vcc line, e.g. conductor 14, due to line inductances, the sensors near the Vcc source will experience a fast Vcc rise time whereas the most remote sensor will see a much slower rise time.

This feature is realized as follows. Since the comparator input at transistor 92 is connected through two diode-connected transistors 93 and 95 to the 4.7 volts line while the other input at the base of transistor 94 is connected to the Vcc line, the rising voltage of Vcc must not exceed at any instant of time the rising voltage on the 4.7 volts line plus two $V_{BE}$ (e.g. 1.4 volts) to insure that initially transistor 94 is turned on keeping transistor 92 initially off. This is indeed accomplished as can be seen by referring again to the circuit of the dual voltage regulator 36 in FIG. 4. During the initial rise of Vcc, the voltage on the 4.7 volts line is about equal to the rising Vcc voltage minus a $V_{SAT}$ (across the PNP transistor 75) and a $V_{BE}$ (across the base-emitter junction of transistor 50). At the instant during the rise of Vcc that the voltage on the 4.7 volts line stabilizes at 4.7 volts, the voltage across transistor 75 begins to exceed $V_{SAT}$ and shortly thereafter the difference between the voltage on the Vcc line 14 and that on the 4.7 volts line will exceed 2 $V_{BE}$ causing the multivibrator of reset comparator 42 to switch and produce an output pulse. Thus by making the reset comparator fire after the regulator 36 reaches stable regulation, the sensor is not dependent upon supply line voltage rise times. Also, transistors 100 and 102 form a circuit for terminating the one-shot m.v. output pulse with hysteresis to guard against inadvertant triggering by line noise.

The circuit including transistors 104, 106, 108, 110, 112 and 114 provides power amplification, pulse delay and pulse inversion.

Figure 6:
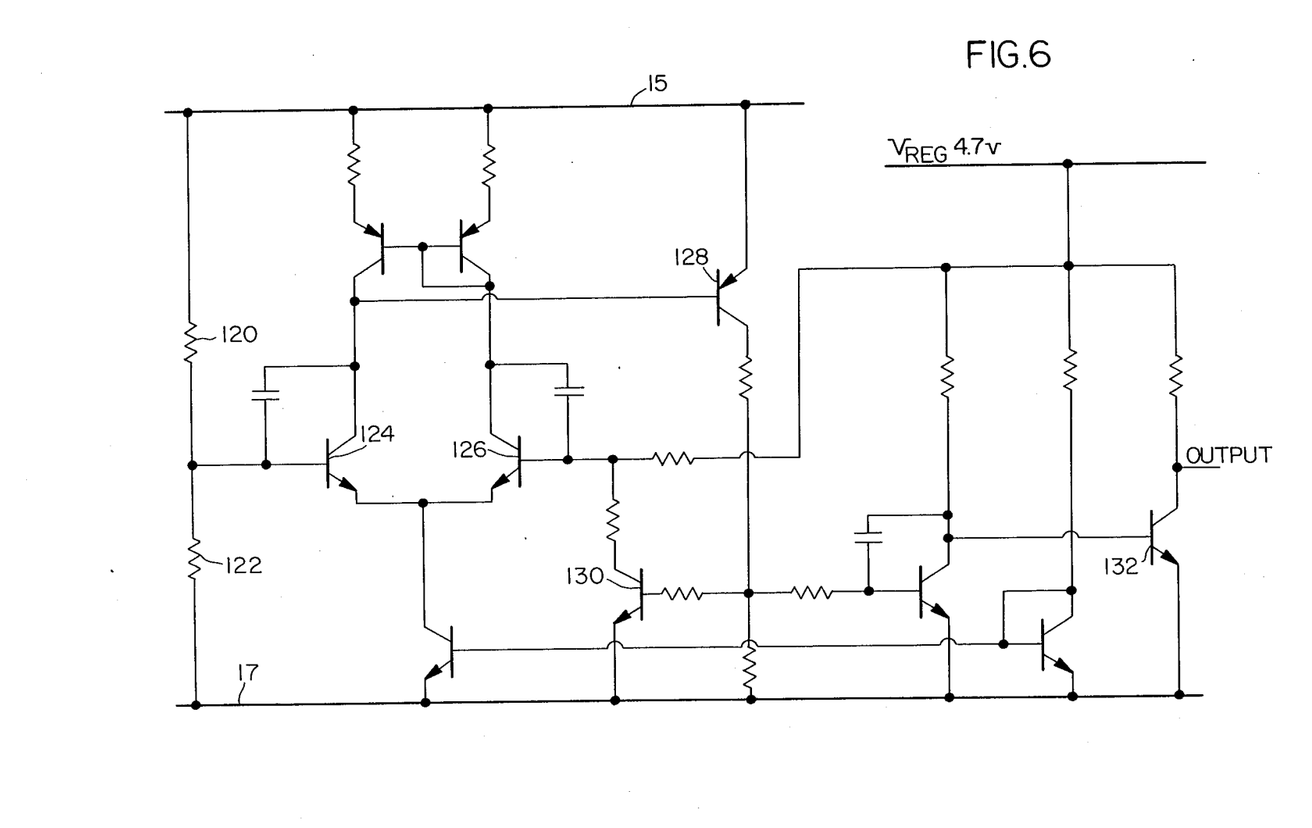
FIG. 6 is a circuit diagram of the level shifting comparator 24.

The level shifting comparator 24, like the reset comparator 42, is mainly energized from the Vcc line 14 and also uses the regulated 4.7 volts as a comparative reference voltage as can be seen from inspection of the level shifting comparator circuit in FIG. 6. The addressing pulses 22 that are superimposed on the DC supply voltage Vcc at sensor pad 18 are level shifted downward, diminished by about $2\frac{1}{2}$ times and presented by divider resistors 120 and 122 at the comparator input at the base of transistor 124. The regulated 4.7 volts applied to the other comparator input at transistor base 126 is normally greater than the voltage supplied to the base of transistor 124 in the absence of an addressing pulse 22, and thus transistor 126 is normally on while transistor 124 and feedback transistors 128 and 130 are all normally off.

This unique comparator actually compares its own energizing voltage to a reference voltage and produces a standard height (4.7V) pulse at its output at the collector of transistor 132 when Vcc plus the superimposed addressing pulse reaches a predetermined value (e.g. 8 volts). It also provides hysteresis (e.g. of about 1 volt) and terminates the output pulse when the voltage falls at the end of an addressing pulse to a lower predetermined value (e.g. 7V).

Figure 7:
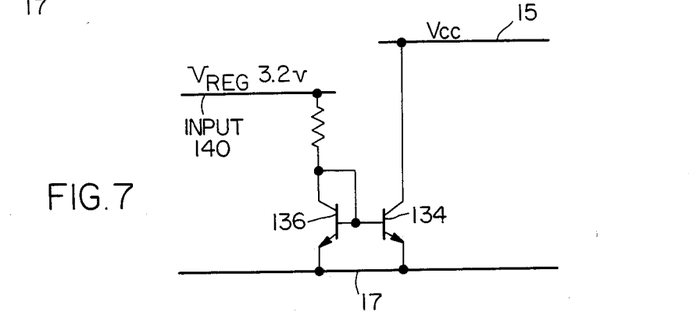
FIG. 7 is a circuit diagram of the switchable source 40.

The switchable current source of FIG. 7 has an output transistor 134 having a base-to-emitter junction area ten times that of the transistor 136. When the control input conductor 140 is connected to the 3.2 volts line, the current sinked by transistor 134 from the Vcc line is about 12 milliamperes.

Although the embodiment herein described employs a magnetic field to electrical signal transducer (Hall transducer), other field to electrical field transducers are meant to fall within the scope of this invention. Also, the term "field" is employed herein in its most broad and generous sense, encompassing magnetic, electrostatic, electromagnetic and nuclear radiation fields. Thus transducers included in sensors of this invention may be resistor temperature or mechanical strain gauges, light sensitive diodes and the like.

What is claimed is:

1. A two-terminal multiplexable sensor comprising a silicon integrated circuit chip comprising:
   (a) a power terminal and a ground reference terminal;
   (b) a binary counter means connected to said power terminal for counting the number of voltage pulses of one polarity that are superimposed on a DC supply voltage applied to said power terminal;
   (c) a fixed binary address code circuit means for providing a particular fixed-circuit binary-number address code by which said sensor may be distinguished electrically from other two-terminal multiplexable sensors;
   (d) an address code comparator means connected between an output of said binary counter means and said fixed address code circuit means for providing at an output thereof a match signal only when the count of said counter means matches said address code;
   (e) a switchable current source connected between said power terminal and said ground terminal and having a control input;
   (f) an ambient-field-to-electrical-signal transducer, having an output connected to said control input of said current source, for switching on said current source when the ambient field strength exceeds a predetermined amount; and
   (g) a transducer control means connected between said output of said address code comparator means and said transducer
   for turning on said transducer and switching on said current source for at least one particular portion of each period during which both the ambient field exceeds said amount and the count of said counter means matches said address code, so that the current-source current occuring during said one portion of each said period provides a signal through said power terminal indicating the presence of the ambient field that exceeds said amount, and
   for turning off said transducer during all other periods during which the count of said counter means does not match said address code.

2. The two-terminal sensor of claim 1 wherein said control means comprises a voltage regulator means having one regulated voltage output connected to said transducer means for energizing said transducer from an electrically-controllable regulated DC voltage that is on during the portion of each period during which the field strength exceeds said amount and the count of said counter means matches said address code, and is off at all other times.

3. The two-terminal sensor of claim 2 wherein said voltage regulator means has another output connected to said address code comparator means for providing thereto a fixed regulated-DC-voltage energy source.

4. The two-terminal sensor of claim 1 wherein said binary counter means is comprised of a binary counter circuit and a supply voltage comparator means for producing an output pulse voltage that changes from a ground reference level to another voltage level when the DC supply voltage is increasing and exceeds a first amplitude and that subsequently changes from said another level to said ground level when the DC supply voltage is decreasing and falls below a second amplitude which is lower than said first amplitude, said supply voltage comparator means having an output connected to the input of said counter circuit.

5. The two-terminal sensor of claim 3 wherein said voltage regulator means is comprised of a bandgap-regulator bipolar-transistor circuit, said another regulator means output connected to said binary counter means to supply energy thereto at a higher voltage than the regulated voltage at said one output of said voltage regulator circuit.

6. The two-terminal sensor of claim 1 wherein said transducer control means is additionally connected to said two terminals and adapted to receive operating energy from said terminals.

7. The two-terminal sensor of claim 1 wherein said binary counter means is for counting the number of voltage pulses of one kind that are superimposed on the DC voltage, said one kind pulses having the same polarity as that of said DC voltage.

8. The two-terminal sensor of claim 1 wherein said transducer comprises a Hall element for detecting a magnetic field, a Hall sensor amplifier and a Schmitt trigger circuit, all connected in tandem.

9. The two-terminal sensor of claim 2 additionally comprising a reset comparater means connected to said power and ground terminals and connected to said counter means for resetting the count of said counter means to zero when the voltage of said power terminal mementarily drops to zero, said voltage regulator means having another output connected to said reset comparator means for providing thereto a fixed regulated DC voltage.

10. The two-terminal sensor of claim 9 wherein subsequent to a momentary drop to zero of said power terminal voltage said reset comparator means is addtionally for holding and counting means reset to zero count during an initial rise in the power-terminal voltage until the fixed regulated voltage has stabilized and the power-terminal voltage has increased a predetermined amount above the fixed regulated voltage.

11. The two-terminal sensor of claim 9 wherein said transducer control means is additionally for switching on said current source during another particular portion of every period during which the count of said counter means matches said address code so that the current-source current occurring during said another portion of every period provides a signal through said power terminal indicating the presence and operability of said sensor, whether or not said magnetic field is present.

12. A two-terminal-multiplexable sensor of the kind having two DC voltage supply terminals, an identifying circuit means for identifying a unique predetermined electrical-signal address code when it appears at said two terminals and placing said sensor in an addressed condition for an addressed interval that endures until another code appears, and an ambient-field-to-electrical-energy transducer means for, during an addressed interval and when in the presence of a particular minimum-amplitude field, increasing the electrical load across said two terminals to indicate the presence of that field wherein the improvement comprises:
- a voltage regulator circuit connected to said two terminals and connected to said transducer means for transforming a DC supply voltage appearing at said two terminals to a regulated DC voltage and supplying said regulated DC voltage to energize said transducer means; and
- an enabling circuit means connected to said voltage regulator circuit and connected to said identifying circuit means for turning on said regulated DC voltage to energize said transducer means during an addressed interval and turning off said regulated DC voltage and essentially eliminating the DC energizing current to said transducer means when another electrical-signal code is presented at said two terminals.

* * * * *